Dec. 14, 1943.　　　　R. B. CRAWFORD　　　　2,336,674
LIQUID-SOLID TRANSITORY PHASE AIR COOLING OR CONDITIONING SYSTEM
Filed April 18, 1940　　　　4 Sheets-Sheet 1
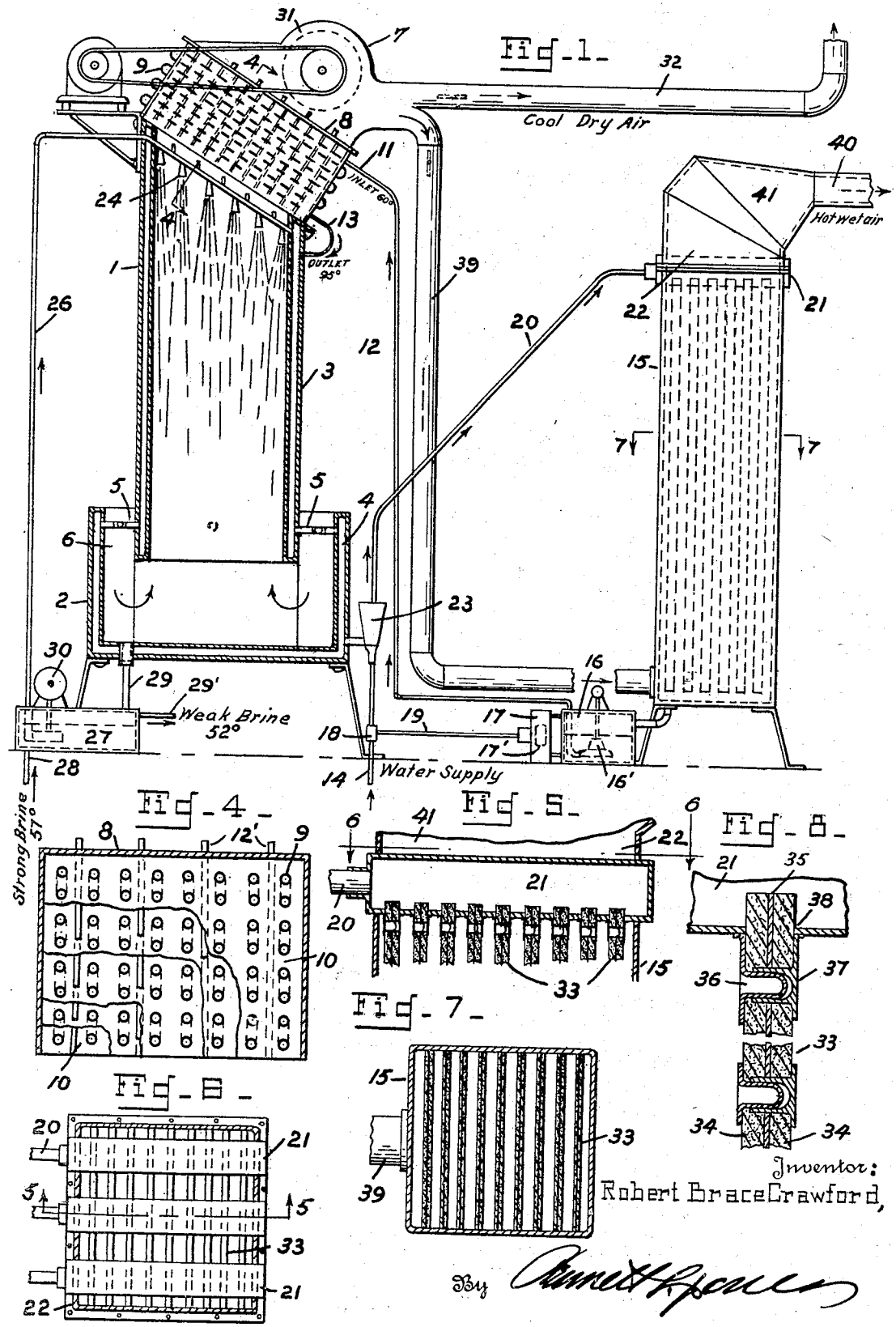

Dec. 14, 1943.  R. B. CRAWFORD  2,336,674
LIQUID-SOLID TRANSITORY PHASE AIR COOLING OR CONDITIONING SYSTEM
Filed April 18, 1940  4 Sheets-Sheet 2
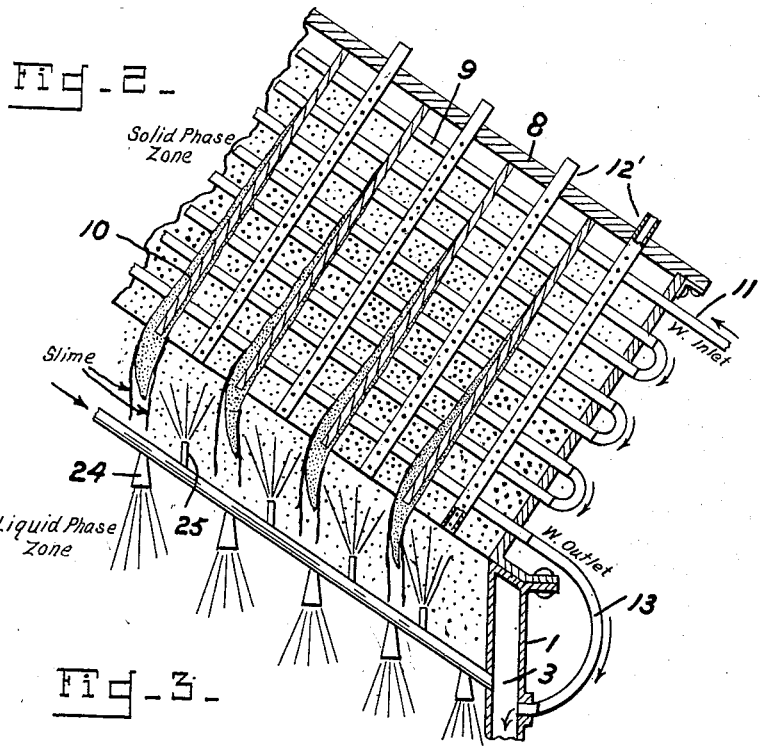
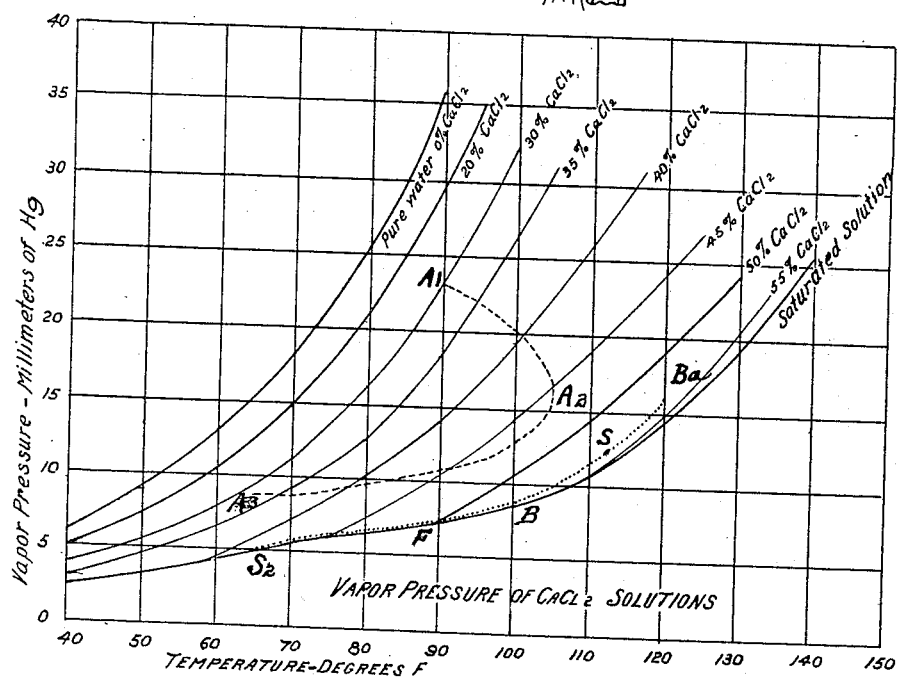
Inventor:
Robert Brace Crawford,
By
Attorney.

Dec. 14, 1943.  R. B. CRAWFORD  2,336,674
LIQUID-SOLID TRANSITORY PHASE AIR COOLING OR CONDITIONING SYSTEM
Filed April 18, 1940  4 Sheets-Sheet 3
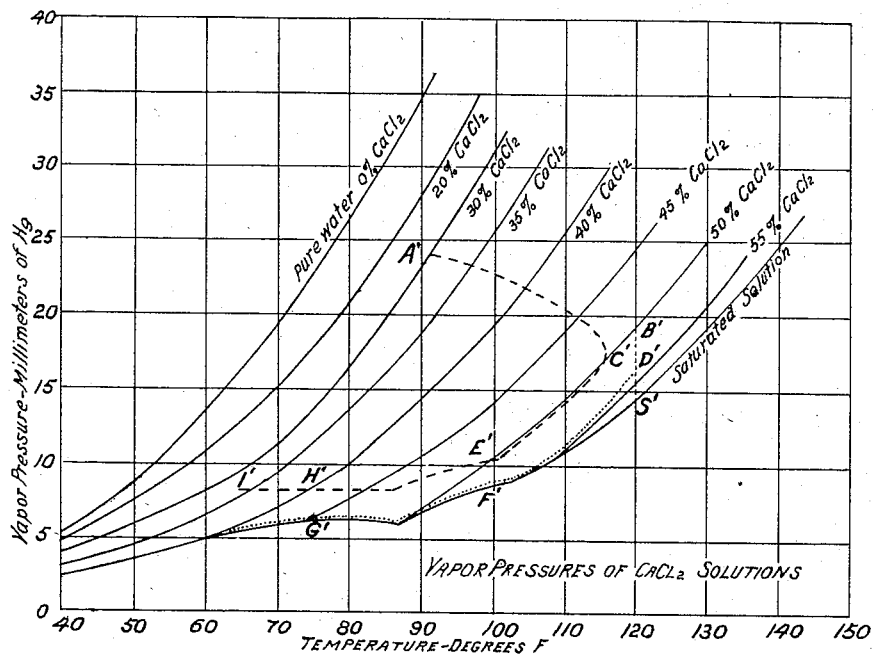
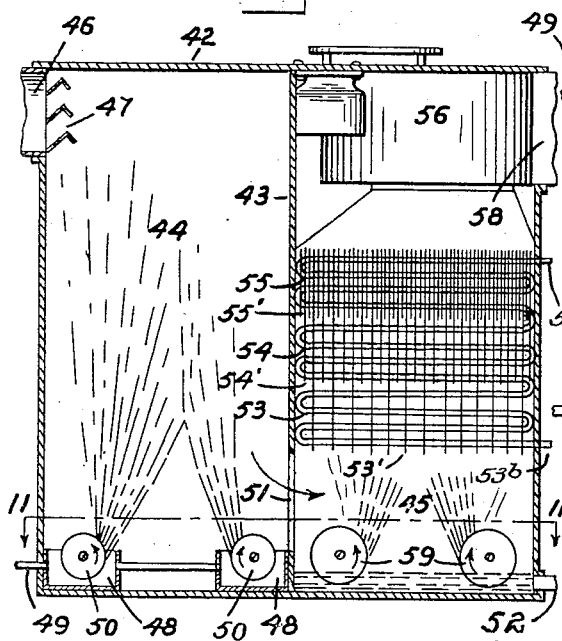
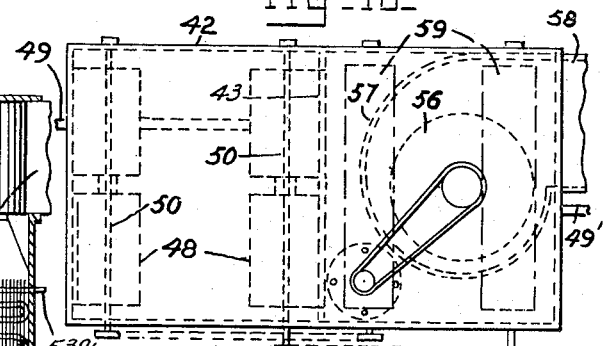
Inventor:
Robert Brace Crawford,
By [signature]
Attorney.

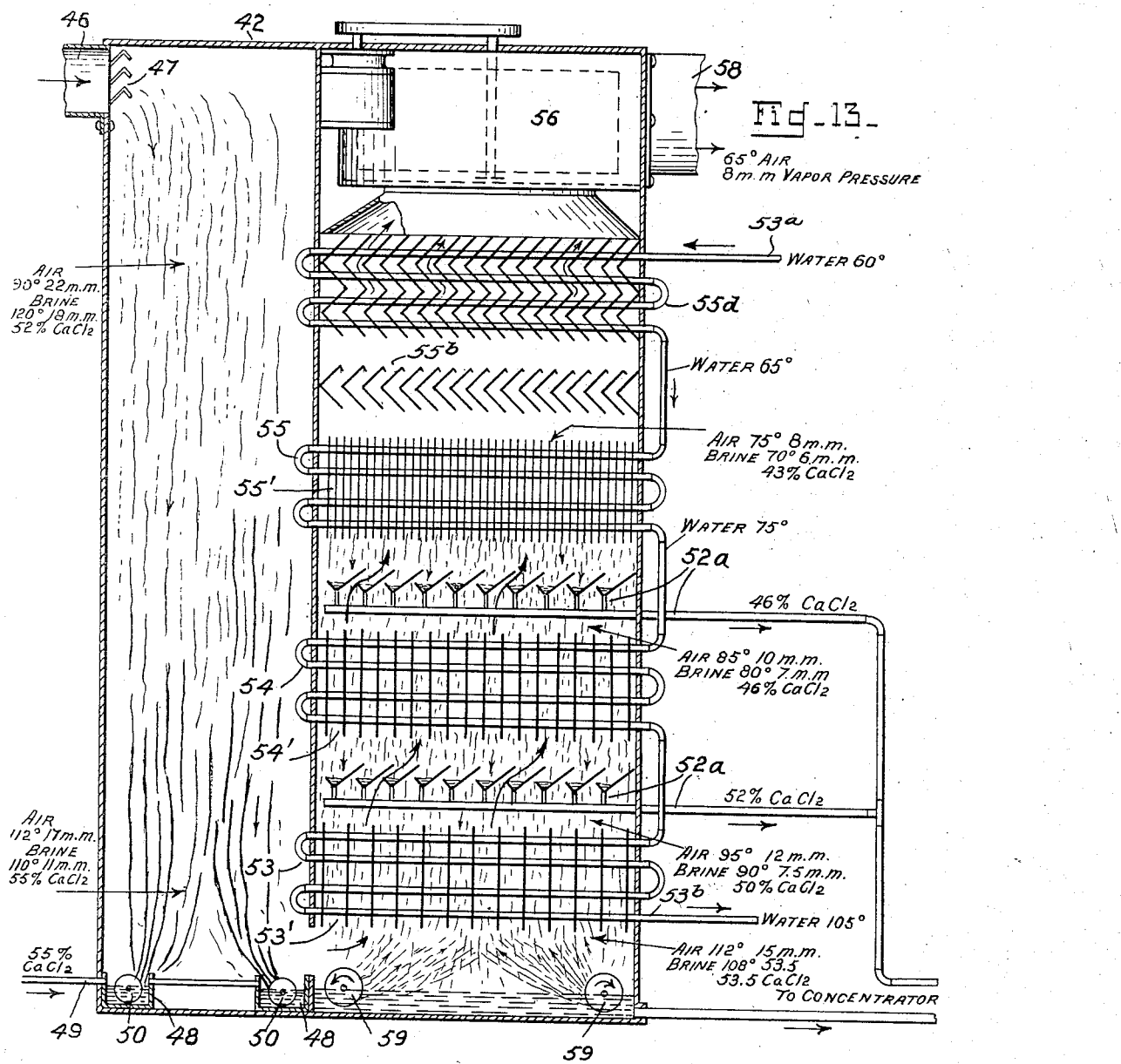

Patented Dec. 14, 1943

2,336,674

UNITED STATES PATENT OFFICE 2,336,674

LIQUID-SOLID TRANSITORY PHASE AIR COOLING OR CONDITIONING SYSTEM

Robert Brace Crawford, Iola, Kans.

Application April 18, 1940, Serial No. 330,406

17 Claims. (Cl. 183—4.3)

This invention relates to a novel method of and apparatus for the cooling or conditioning of air, and is particularly directed to a system of air conditioning wherein the air is contacted directly with a hygroscopic agent for removing latent heat and moisture from the air while simultaneously indirectly contacting the air with a heat transfer medium for removing sensible heat from the air.

The principal object of the invention is to provide a system of air conditioning of the chemical absorption type in which the differential between the aqueous vapor pressure of the hygroscopic solution and the aqueous vapor pressure of the air in contact with the solution is kept at a substantially uniform value whereby a highly efficient dehumidifying and cooling action is obtained.

Another object of the invention is to provide an air conditioning system in which the air is contacted serially with a deliquescent chemical salt first in liquid phase and then in solid phase in such manner and under such conditions as to secure the removal of moisture and latent and sensible heat from the air in a most effective manner.

Still another object of the invention is to provide for the removal of latent and sensible heat from air in such manner and at such rates that the heat removing medium in indirect contact with the air is passed in truly counter-current relation to the air or in both counter-current and concurrent relation to the air.

Still another object of the invention is to so arrange and use the drying and cooling means in a chemical absorption system that a minimum area of surface is required.

Still another object of the invention is to make the maximum use of adiabatic dehumidification before contacting the air in the last stages of dehumidification with the heat removing medium in order to economize in and use a minimum amount of the heat removing medium through a wide range in temperatures.

The method of the invention comprises flowing air in contact with an extended surface of a hygroscopic agent varying from a state of solution, or having a liquid phase drying zone, to a more or less solid state, or having a solid phase drying zone, and bringing a heat transfer medium into heat exchange relation with the hygroscopic agent in the solid phase zone thereof in such manner as to provide a decreasing temperature gradient in the direction of flow of the stream of air so as to maintain the aqueous pressure differential of the hygroscopic agent and the air at the desired predetermined differential.

While this invention is of particular value and extremely economical in operation in systems using all outdoor air, it may also be used to advantage in systems using recirculated air by bringing the return air in at the proper temperature level in the cooling or solid zone.

The economical use of water as a cooling or heat removing medium through a wide temperature range is a particular novel and important feature of the present invention, and is one of serious consideration to authorities having jurisdiction over well or city water properties. The present invention provides for the use of cooling water in an economical way and the cooling of the water by a regenerative water cooler of novel design.

The invention will be more particularly described with reference to the use of calcium chloride as the hygroscopic substance. The principles of the invention are illustrated in the accompanying drawings, in which—

Fig. 1 is a diagrammatic representation partly in elevation and partly in section of one form of air conditioning apparatus embodying the invention.

Fig. 2 is a schematic perspective view of the sprayers and extended surface coil of the apparatus shown in Fig. 1 illustrating the details of construction of the coil and the phase actions.

Fig. 3 is a graph showing the relations of the proper pressures of calcium chloride solutions to the temperature and concentration of the solution and the working action with the form of apparatus illustrated in Fig. 1.

Fig. 4 is a section on line 4—4 of Fig. 1 through the extended surface coil with parts broken away to show different portions of the coil.

Fig. 5 is a section on line 5—5 of Fig. 6.

Fig. 6 is a section on line 6—6 of Fig. 5.

Fig. 7 is a section through the regenerator or evaporative cooler on the line 7—7 of Fig. 1.

Fig. 8 is an enlarged fragmentary vertical section through the cooler and one of the evaporating plates of the regenerator showing the features of construction thereof.

Fig. 9 is a sectional elevational view of another form of apparatus embodying the principles of the invention.

Fig. 10 is a top plan view of the same.

Fig. 11 is a section on the line 11—11 of Fig. 9.

Fig. 12 is a graph similar to Fig. 3 showing the working conditions with the form of apparatus shown in Figs. 9, 10 and 11.

Fig. 13 is a view similar to Fig. 9 showing a further modified form of the invention.

It is well known that the aqueous vapor pressure of a hygroscopic solution such as results from dissolving calcium chloride in water decreases with increase of concentration and increases with rising temperature. But the vapor pressure does not change in regular relationship with changes in temperature and concentration. Referring to the vapor pressure-temperature chart shown in Fig. 3, it will be noted that the temperature of a calcium chloride solution can be lowered from about 76° F. to 53° F. without the solution becoming saturated, but with considerable drop of vapor pressure (from 6.2 to 3.8 mm. of mercury), while the concentration is lowered proportionately from about 45% to 40%. But the temperature can be dropped through the range from 87° F. to 76° F. while the concentration is lowered from 50% to 45% without any appreciable drop in vapor pressure. It remains at about 6.2 mm. of mercury. Above 87° F. the vapor pressure rises rapidly with rise in temperature.

In view of the proportions of calcium chloride solutions as represented in Fig. 3, it has been found particularly advantageous, when utilizing calcium chloride solutions in the air conditioning system of the invention, to supply to the zone of contact a solution of calcium chloride approaching 55% in concentration at a temperature of about 110° F., and to divide the zone of contact into liquid phase and solid phase zone portions, in order to secure a better equalization of vapor pressures to bring about the desired result and to effect dehumidification and cooling of the air in a simple and most efficient manner.

The air conditioning system shown as an illustrative example in Figs. 1 to 8, inclusive, comprises a dehumidifying and cooling casing or tower 1 in open communication at its bottom with a base chamber 2. The tower 1 and chamber 2 are double walled, providing water jackets or spaces 3 and 4, in communication through pipe connections or unions 5 holding the tower in spaced relation to the chamber to form an inlet 6 for admission of the air to be conditioned. At its top the tower is cut away at an oblique angle for corresponding arrangement between the same and a fan casing 7 of a jacket or casing 8 containing an extended surface dehumidifying and cooling coil 9 provided with fins 10. This coil has an inlet end 11 connected with a water conducting pipe 12 and an outlet end 13 communicating with the jacket 3, the fins 10 of said coil being arranged and cooperating with the coil convolutions to form restricted passages or spaces for flow of air between said convolutions and the fins from the tower to the fan chamber.

In the illustrated example, the dehumidifier and cooler is shown for use in connection with a pipe 14 for supplying cooling water from a well, city water line or other suitable source of supply, and also for use in connection with an evaporative cooler 15 for cooling the recirculated heat release water by the use of dehumidified air from the dehumidifier 1. In the arrangement shown water pipe 12 leads to the cooling coil from a chamber 16 communicating with and receiving the cooled water from the evaporative cooler 15 and from which the water is delivered by pump 16' to the pipe 12. This chamber 16 is in communication with a float valve chamber 17 in which is a float 17' controlling a valve 18 in the water supply pipe 14 through a suitable connection 19 so as to govern the supply of fresh cooling water to the system as and when required to compensate for evaporation losses. Pipe 14 is connected by a delivery pipe 20 with headers 21 in the head portion 22 of the evaporative cooler chamber 15, the pipe 20 being also connected with the bottom of the water space or jacket 4 in the chamber 2 and having arranged therein an ejector 23 whereby the heat laden water passing from the coil to the jacket 4 is withdrawn from the jacket 4 and forced through pipe 20 to the headers 21 of the evaporative cooler, mixed or not with fresh water from the supply pipe 14. The casing 1 and chamber 2 form a liquid phase zone portion of the dehumidifying unit in which a concentrated solution of the hygroscopic agent contacted by the traveling air is in vapor or spray form, while the casing 8 and coil 9 form a solid phase zone portion in which the hygroscopic agent contacted by the traveling air is in a more or less solid state. At the top of the tower 1 beneath the coil 9 is a set of spray nozzles 24 for spraying the hygroscopic solution in the form of coarse spray downwardly into the tower 1 and a set of spray nozzles 25 for projecting the solution in the form of finer spray upwardly in contact with the surface of the cooling coil 9 and fins 10. The spray nozzles are supplied with strong brine of the desired concentration through a pipe 26 leading from a brine receptacle 27 which is in communication at its lower portion with a pipe 28 which may lead from a concentrator or other source of supply of strong brine, and which is in communication at its upper portion with a drain pipe 29 leading from the chamber 2 and through which the weak brine deposited in the chamber 2 is discharged into receptacle 27 for passage therefrom to a pipe 29' leading to the concentrator. A pump 30 forces the strong brine from the receptacle 27 to the spray nozzles 24 and 25. As the air travels upward through the tower 1 it contacts with a mist or spray formed of coarse drops of the solution discharged by the nozzles 24 and particles of slime dripping from the coil, whereby the air is deprived of a substantial amount of its moisture. The air then flows upwardly over the surfaces of the convolutions of the water cooling coil and fins 10, on which the spray solution discharged by the nozzles 25 together with that from the nozzles 24 carried upwardly by the air has been deposited and has become more or less solidified, whereby the air is further deprived of moisture and cooled to the desired degree. This cool dry air is drawn into the fan casing 7 and discharged by the action of the fan 31 into a duct 32 which conducts the cool dry air to the space to be conditioned. The water flowing from the cooling coil through the jackets 3 and 4 keeps the tower 1 and receptacle 2 cool, but these parts may be air cooled, if desired, and the drain water from the coil otherwise disposed of or supplied to the evaporative cooler 15.

The evaporative cooler 15 comprises a tower at the top of which are arranged any desired number of the headers 21. Below these headers 21 are spaced evaporating plates 33, each comprising a pair of outer layers or sheets 34 of asbestos or other bibulous or absorbent material between which is disposed a metallic reinforcing or stiffening plate 35. The plates 34 and 35 are perforated at intervals to receive interengaging fastening members 36 and 37 of snap fastener or other suitable type whereby they are fastened together. The upper edges of the plates are fitted with clearance in slots 38 in the bottom walls of the headers 21, so that the absorbent plates will take up and become saturated with the water delivered into the headers 21 and which will flow downward through and over the surfaces of the plates to the bottom of the tower 15, the released water passing from the bottom of the tower into the chamber 16 for re-delivery to the water cooling coil of the dehumidifier. A duct 39 leading from the fan chamber 7 is provided to deliver a portion of the cooled air to the bottom of the tower 15, which air passes upwardly through the spaces between the evaporating plates 34 to effect a cooling of the water in a well known manner. The hot wet air from the top of the tower 7 discharges through an outlet 40, between which and the top of the tower may be arranged an eliminator 41 for an obvious purpose.

The operation with the system shown in Figs. 1 to 8, inclusive, will be readily understood by reference to the chart illustrated in Fig. 3. For a proper understanding values of the vapor pressures of the system $CaCl_2+H_2O$ used as examples should be considered. Fig. 3 gives these values. Assuming that the dehumidifying unit is supplied with 53% $CaCl_2$ solution at 112°, part of the solution, the larger part, will be discharged by nozzles 24 in the form of large drops, while the smaller portion will be atomized or discharged by nozzles 25 in the form of small drops. Air entering the unit at the bottom contacts the brine counter-currently, and as it travels upward contacts an increasingly viscous brine which in in the form of a mist, and then contacts a thin film spread over the cooling coil 9 at the top of the unit. As the brine film is chilled down the air is further dehumidified and although the brine concentration is decreasing rapidly some of the brine will turn to salt and thus give saturated solution vapor pressure performance. A great portion of the brine cannot turn to salt and thus plug up the coil because any sizable salt film would decrease the heat transfer from the coil to such a point that the brine would go back into solution at some higher temperature in the presence of humid air passing around the coil.

Should the air flow be shut off and the coil become sub-cooled, plugging might occur. To prevent this, perforated tubes 12' on close centers may be enmeshed in the fins between the rows of tubes in the coil to allow air to pass out in direct contact with the coil surface itself. Such air will soon melt any solidified brine.

As the water flow through the coil is counter-current, the brine is maintained in a substantially counter-current vapor pressure relation to the air. It is possible, however, under certain weather conditions with $CaCl_2$ or with other brines to operate such a cycle so that the performance in the vertical liquid-phase counter-current brine-air contactor section will be adiabatic while that in the solid-phase or coil section will be counter-current.

Referring now more particularly to the chart shown in Fig. 3, brine enters unit at lower right hand corner S, and leaves unit at a point above S, on the 52–53% line at 120° above S at $Ba$. With these assumptions 112°—53% $CaCl_2$—vapor pressure=13 mm.
120°—53% $CaCl_2$—vapor pressure=17 mm.

Air enters at 77° dew point temperature=23 mm., leaves the spray stage at 17.5 mm., A2.

It will be understood that the mist deposited on the cooling coil surfaces remains a liquid until it is cooled to 100° where it turns partly solid. $Vp=8.3$ mm. at B. 53% $CaCl_2$. As this saturated solution becomes chilled and diluted, since it removes moisture from the air and is cooled on passing upward into contact with the coil, there will be 50% partly solid saturated solution of 87° with a vapor pressure of 6.5 mm. at point F, and as the solution and air proceed to a colder portion of the coil the vapor pressure of the solution remains substantially at 6.5 mm. to 76° and 45% $CaCl_2$. From here on up the coil, depending on how cool the coil is, the solution may reach 40% $CaCl_2$ at 52° with 3.6 mm. vapor pressure. As graphically shown in Fig. 3, air enters system top center A1, brine enters right side at S, brine goes up 53% curve substantially as it drops in unit and down 53% curve to saturated solution line B and down saturated solution line to S2 as brine and air go up into coil. The vapor pressure of the air approaches the vapor pressure of the brine in its path S, $Ba$, B, F, S2 at each step A, A2, A3 in the path of the air through unit, viz.

A1, vapor pressure air=23 mm. V. P. at $Ba$ brine 17 mm. $Ba$.
A2, vapor pressure air=17 mm. V. P. at S=13 mm.
A3, vapor pressure air=7.5 mm. V. P. at S2= 4.6 mm.

The log mean vapor pressure differential of such a path of vapor transfer would be about 4 mm. which is considered satisfactorily safe in chemical dehumidifying work.

Fig. 2 shows a part of the solid phase or coil section and illustrates the manner in which the $CaCl_2$ is deposited on the coil and fin surfaces. The mist entering the coil section is well spread over the coil surface. When the solution becomes weak and not quite saturated it will flow if sufficiently liquid along the fin surfaces and drop into the main body of solution in the spray section, the more solid brine being deposited in the form of a film comprising a partly solid saturated solution. The liquid or slime also runs over the solid deposits and drips back into the spray section. The film deposited along each fin surface may assume, as shown, a layer form of a varying depth and a stalactite-like shape, particularly at light loads.

The advantage of employing a dehumidifying and cooling unit of the type shown in Figs. 1 to 8, inclusive, for use in an air conditioning system, is that a unit is provided which is simple of construction, inexpensive in construction and operation, and which is not liable to get out of order. Another important advantage is that it effects a cycle of operation in which the vapor pressures of the brine and air are kept practically constant and dehumidification and cooling of the air effected in a most effective manner and with the use of a minimum amount of cooling water and cooling surfaces at all temperatures. The coil also serves as a brine eliminator, although safety filters may be used to eliminate residual brine from the outgoing air.

As stated, spray section may be water jacketed as shown or air cooled. The city water makeup to the evaporative cooler may be used to suck the water out of the jacket and thus reduce the pressure thereon.

In the form of the invention shown in Figs. 9, 10 and 11, a dehumidifying and cooling casing or tower 42 is employed which is divided by a partition 43 into stage compartments 44 and 45. The compartment 44 is provided at top with an air inlet 46 guarded by baffles 47, and is provided at its bottom with sumps 48 supplied with strong brine through pipe 49 from a concentrator or other source of supply. Rotary impellers 50 force the brine from the sumps upwardly in the form of a mist or spray in compartment 44. The air travels downwardly through this spray and passes through port 51 in partition 43 into the base of compartment 45, and thence upwardly into and through said compartment 45. Brine from compartment 44 also flows through port 51 into the bottom of compartment 45, from which a portion of the brine flows through a pipe 52 to a concentrator. In the compartment 45 are rows of finned coils, in the present instance three in number, 53, 54 and 55, said coils having fins 53', 54' and 55' and being connected in series and having an inlet end 55a and an outlet end 53a for admission and exhaust of the cooling water. At the top of the compartment 45 is a fan casing 56 in which is a fan 57 which effects the circulation of air through the compartments 44 and 45 and forces the dehumidified and cooled air through a duct 58 to the space to be conditioned. In the base of compartment 45 are impellers 59 for impelling the brine upward in the form of a fine mist. In practice, the coils 53, 54 and 55 may be a twelve row cooling coil, the first four rows or convolutions forming the bottom section 53 being widely spaced and having wide fin spacing to allow the fine brine mist to be carried upward by the air. Also the first or bottom coil section 53 will be mainly brine wetted, salt solidification on the outside of the coils not taking place until the brine is deposited on the coils and fins thereof and also on the coils and fins of the four convolutions forming the middle coil section 54. The convolutions and fins of the middle coil sections are more closely spaced than the convolutions and fins of said bottom coil section 53. The top convolutions or rows forming the coil section 55 and their fins are more closely spaced than the convolutions and fins of coil sections 53, 54, and so spaced as to eliminate all the entrained brine mist and form a final solidification area.

Where height permits, the sets of four coil rows, as shown in Fig. 13, each could be separated by eliminators 55a and the weak brine (slime) of the solidified portion could be drained off through drain conductors 52a and sent back to the concentrator without diluting the brine in the dehumidifying unit, thus giving even higher efficiency than otherwise might be possible.

The structure disclosed in Figs. 9, 10 and 11 provides a practical design which makes for slightly higher efficiency than that disclosed in Figs. 1 to 8, inclusive, although the principles involved are the same. The log mean temperature and vapor pressure differences will be greater with a given design of equipment, or with the same temperature and vapor pressure differentials a higher temperature in the leaving water may be attained than with the unit as shown in Figs. 1 to 8, inclusive.

In the form of the invention shown in Figs. 9, 10 and 11, the working characteristics of which are illustrated by the graph shown in Fig. 12, brine enters the unit at point S', almost saturated and carefully controlled as to temperature. Air enters the unit at A'. In the spray section of the unit where the contact is counter-current to the mist being thrown up by the impellers the brine is cooled somewhat by radiation and heated somewhat by condensation of moisture due to dehumidification and stays about at the same temperature, about 120°, hence in the spray or counter-current portion of the unit brine will go from point S' to point B'. While the brine is going from about 57% to about 52% in this section the air will be dehumidified from point A' to point C' and heated to about 114° and a mixture of strong brine and weak brine at point D' contacts the air as it starts upward through the coil section. The approach between the vapor pressure of the brine and the vapor pressure of the air stays practically constant as the air goes from point C' to point E' and the brine goes from point D' to point F'. At this point solidification begins to take place and a saturated solution of brine slime is encountered on the outside of the solidified portion of the brine on the fins of the coil (point F') and the brine slime encountered on the upward path will get a vapor pressure going from point F' to point G', the air meanwhile being dehumidified and cooled slightly from point E' to point H'. In order to ensure the elimination of all traces of the brine and also to bring a close approach between temperature of air leaving and temperature of water entering some dry coil not encountered by brine mist or beyond the section of coil on which the brine is solidified cools the air from point H' to point I' where the air leaves the unit. Such a coil would be an additional coil 55d like 55 and above 55 substantially free from brine mist, as shown in Fig. 13. In comparing this path of dehumidification with the path encountered on Fig. 3 it will be apparent that the mean vapor pressure difference between air and brine for a given amount of exposed surface is less with the unit shown in Figs. 9, 10 and 11 than with the unit shown in Figs. 1 to 8, inclusive, which means in effect that dehumidification will occur over a longer path of travel of the air. The addition of one more substantially dry coil will also insure closer temperature approach.

It will be apparent that the invention may be embodied in an apparatus in which the air travels counter-currently, or both counter-currently and concurrently, to the solution spray, and that the cooling water may travel solely counter-currently to the air stream or both counter-currently and concurrently to and with the air stream, and also that the liquid phase and solid phase zones may be traversed by the air in its flow in a single direction or in its flow in opposite directions. Also it is to be understood that, while the structures disclosed are preferred, changes in the form, construction and arrangement of parts may be made within the scope of the appended claims without departing from the spirit or sacrificing any of the advantages of the invention.

What I claim is:

1. The method of dehumidifying and cooling air by means of a deliquescent dehydrating salt, which consists in spraying a concentrated solution of the salt into a space, contacting the air first with the spray of salt solution in said space, collecting and depositing a portion of the salt solution spray on a heat exchange surface so as to form thereon a coating of the salt in a solid state, and then contacting the air with said surface and solid salt while simultaneously cooling said surface.

2. An air cooling or conditioning apparatus comprising an enclosure having primary and secondary compartments forming an air flow course, said primary compartment being provided with an air inlet at its top and said secondary compartment being provided with an air outlet at its top, the compartments being in communication at their base portions for passage of air from one to the other, means in the primary compartment for injecting upwardly therein a concentrated dehydrating spray solution, means at the base of the secondary compartment for injecting upwardly therein a concentrated dehydrating spray solution, means for forming and supplying the concentrated dehydrating solution to the first and second-named injecting means, a cooler in the secondary compartment comprising a plurality of rows of finned cooling coils with which the air contacts after flow through the spray solution, the first row of coils and fins contacted by the air being widely spaced and the succeeding rows of coils more closely spaced, means for moving air through the enclosure, and means for cooling the coils.

3. The method of dehumidifying and cooling air by means of a deliquescent dehydrating salt, which consists in first flowing air through streams of spray of a substantially saturated solution of the dehydrating salt, and then passing the air over a substantially solid coating of the salt formed from the spray solution by depositing the spray solution upon a cooling surface.

4. The method of conditioning air, which consists in flowing air in contact with an extended continuous dehydrating surface formed solely from a substantially saturated chemical dehydrating solution first in spray state and then of varying degrees of viscosity between spray state and a substantially solid state in the direction of flow of the air.

5. The method of conditioning air in succeeding stages by means of a soluble dehydrating salt, which consists in forming a concentrated solution of the dehydrating salt, injecting the solution in the form of spray into a treatment zone, collecting and depositing portions of the injected spray solution upon a surface capable of being internally cooled, cooling said surface so as to effect by heat exchange substantial solidification of the solution, and flowing air first through said spray and then in contact with the solid salt deposited on said surface.

6. The method of dehumidifying air which consists in contacting the air in a first stage of treatment with a concentrated solution of a deliquescent chemical salt in a liquid spray state, and extracting the resultant heat of the absorption in a second stage of treatment from a substantially solid film of the salt formed solely from the spray by deposit of the spray on a heat removing surface, and contacting the air therewith.

7. The method of dehumidifying air which consists in flowing air in a first stage of treatment through a concentrated spray liquid of a deliquescent chemical salt, extracting the resultant heat of absorption in a second stage of treatment from a substantially solid film of the salt formed solely from the spray by flowing and depositing portions of the spray liquid over a surface cooled by a heat removing medium and contacting the air therewith, and circulating the heat removing medium in countercurrent relation to the direction of flow of the air and deposited spray.

8. The method of dehumidifying air which consists in absorbing moisture and heat from the air by flowing air in a first stage of treatment in contact with a concentrated spray liquid of a deliquescent chemical salt, extracting the resultant heat of absorption in a second stage of treatment from a substantially solid film of the salt formed solely by flowing and depositing portions of the spray liquid over a heat removing surface and contacting the air therewith, and maintaining the solid film in dynamic equilibrium between its heat insulating value and the temperature required for its deposition.

9. The method of dehumidifying air which consists in absorbing moisture and heat from the air by flowing air in an extended course countercurrently through streams of a concentrated spray liquid of a deliquescent chemical salt, extracting the heat of absorption by contacting the flowing air with a substantially solid film of the chemical formed by continually flowing and depositing portions of the spray liquid over an internally cooled heat removing surface, and controlling the film deposit so as to maintain a dynamic equilibrium according to the thickness of the film between the condensing moisture on the outside and the flow of heat to the inside of the film.

10. The method of dehumidifying air which consists in flowing the air through spray streams of a strong solution of a deliquescent chemical for adiabatic transfer in a first stage, and subsequently flowing the air over a substantially solid film of the chemical formed solely from the spray solution spread over a cooling surface and maintained in dynamic equilibrium by countercurrent indirect contact with a heat removing medium.

11. The method of conditioning air which consists in flowing the air through spray streams of a saturated solution of a hygroscopic chemical, then contacting the air with a substantially solid film of the chemical formed by directly spraying the solution on a heat removing surface and simultaneously depositing on said surface spray solution previously contacted by and entrained with the flowing air, and continuously so coating said surface with the solution while continuously subjecting said surface to the action of a heat removing medium.

12. The method of cooling or conditioning air by the use of a concentrated solution of calcium chloride or like hygroscopic chemical salt, which consists in injecting streams of the solution of a concentration strength of about 55% and at a temperature of about 110° F. into a treatment space, flowing the air countercurrently in a first stage of treatment through said streams, depositing portions of the injected spray solution upon a heat removing surface, cooling said surface to convert the deposited liquid into a substantially solid film of the salt, and flowing the air in a second stage of treatment over the film of salt so formed.

13. An air conditioning system comprising an enclosure having an air flow course embodying a liquid phase dehumidifying zone and a solid phase cooling zone, means for flowing air through said course and successively through said zones, spraying means for injecting a concentrated hygroscopic salt solution in the form of liquid spray into the liquid phase zone for contact with and travel countercurrently to the air flowing therethrough, an internally cooled heat exchange surface arranged in the solid phase cooling zone so as to be directly exposed to and contacted by the air flowing to said zone from the liquid phase zone and in such relation to the discharge point of the air from the liquid phase zone and to the spraying means as to be coated by spray liquid injected from said spraying means and entrained with the air flowing from the liquid phase zone into the solid phase zone, and means for supplying to the spraying means a concentrated hygroscopic salt solution of a concentration and temperature adapted for maintenance of its liquid spray state in the liquid phase zone and for reduction in temperature of the liquid spray to change the same to a substantially solid film state on its deposit upon the heat exchange surface.

14. An air conditioning system comprising an enclosure having an air flow course embodying a liquid phase dehumidifying zone and a solid phase cooling zone, means for moving air through said course and successively through said zones, a source of supply under pressure of a solution of a hygroscopic salt of a concentration and temperature adapting it for maintenance of its liquid state in the liquid phase zone and to assume under reduction of temperature a substantially solid state in the solid phase zone, injectors for injecting the solution in the form of spray into the liquid phase zone for contact with the air traveling through said zone, injectors for injecting the solution in spray form into the solid phase zone in the direction of travel of the air, an internally cooled extended surface cooling coil arranged in the solid phase zone so as to be coated with the spray liquid from the second-named injectors and contacted by the air flowing from the liquid phase zone into and through the solid phase zone, and means for cooling said coil and the spray liquid deposited thereon to effect by heat exchange an increase in viscosity of the coating to form and maintain a substantially solid film of the hygroscopic salt on the surface of the coil.

15. An air conditioning system comprising an enclosure having an air flow course embodying a liquid phase dehumidifying zone and a solid phase cooling zone, means for moving air through said course and successively through said zones, a source of supply under pressure of a solution of a hygroscopic salt of a concentration and temperature adapted for maintenance of its liquid state in the liquid phase zone and for conversion into a solid state under reduction of temperature in the solid phase zone, injectors for injecting the solution in the form of liquid spray into the liquid phase zone for contact with and travel countercurrently to the air traveling through the zone, an internally cooled heat exchange surface in the solid phase zone arranged so as to be directly exposed to and contacted by the air on its flow into said zone from the liquid phase zone and to be coated with the spray liquid injected by the injectors and entrained with the air on its flow, and means for cooling said surface to reduce the coating to a more or less solid state and to provide a decreasing temperature gradient in the direction of flow of the air so as to maintain the aqueous pressure differential of the hygroscopic agent and the air at the desired predetermined differential.

16. In an air conditioning apparatus, an enclosure having an air inlet and an air outlet, an internally cooled surface disposed in the enclosure between the air inlet and outlet, means for causing passage of the air to be conditioned through through the enclosure, means for supplying and injecting in an atomized state into the enclosure and in the course of travel of the air between the air inlet and cooling surface a concentrated solution of a dehydrating substance of a concentration value for initial contact with and adiabatic dehumidification of the air in such course of travel and for deposit in an atomized state on the cooling surface for transition by heat exchange action into a solid film of the dehydrating substance to be contacted by the air on its flow over the cooling surface toward the air outlet, means for continuously internally cooling said cooling surface to maintain a temperature causing transition of the dehydrating substance from an atomized liquid to a substantially solid film state during travel of the air to be conditioned in normal volume through the enclosure, and means for supplying a heat exchange medium for externally raising the temperature of the cooling surface and film to control and prevent undue thickness of film deposit on said surface when the flow of air is cut off or materially reduced.

17. An air cooling or conditioning apparatus comprising an enclosure having an air flow course provided with an air inlet and an air outlet, means for injecting into said enclosure spray streams of a substantially saturated solution of a dehydrating salt through which the air flows in a first stage of treatment, a plurality of rows of finned cooling coils arranged so as to be coated with portions of the injected spray solution for the reduction of the coatings by heat exchange to a substantially solid film state and in contact with which coils and their coatings the air successively flows in a second stage of treatment, the first row of coils and fins contacted by the air being widely spaced and the succeeding rows of coils more closely spaced, means disposed between coils of the rows for draining off free solution dripping from the coils, an eliminator in the enclosure between the last row of finned coils and the air outlet, a cooling coil arranged between the eliminator and air outlet so as to be contacted by cooled air substantially free from solution, means for cooling the coils, and means for moving air through the enclosure.

ROBERT BRACE CRAWFORD.